United States Patent [19]

Hayase et al.

[11] 4,304,821

[45] Dec. 8, 1981

[54] METHOD OF FABRICATING METALLIC SANDWICH STRUCTURE

[75] Inventors: Masashi Hayase, Fountain Valley; Richard C. Ecklund, Lakewood; Robert J. Walkington, Garden Grove; James B. Hughes, Long Beach; Neil R. Williams, Huntington Beach, all of Calif.

[73] Assignee: McDonnell Douglas Corporation, Long Beach, Calif.

[21] Appl. No.: 79,781

[22] Filed: Sep. 28, 1979

Related U.S. Application Data

[62] Division of Ser. No. 898,197, Apr. 18, 1978, Pat. No. 4,217,397.

[51] Int. Cl.³ .................. B23K 28/02; B21D 26/02
[52] U.S. Cl. .................. 428/593; 228/157; 156/79; 428/178; 428/594
[58] Field of Search .................. 228/157, 193; 156/79; 428/178, 593, 594

[56] References Cited

U.S. PATENT DOCUMENTS

| | | | |
|---|---|---|---|
| 3,003,599 | 10/1961 | Rubissow | 29/455 R X |
| 3,547,751 | 12/1970 | Morgan | 428/178 X |
| 3,792,141 | 2/1974 | Offutt | 156/79 X |
| 3,924,793 | 12/1975 | Summers et al. | 228/157 |
| 3,927,817 | 12/1975 | Hamilton et al. | 228/157 |
| 3,996,019 | 12/1976 | Cogan | 228/193 X |

FOREIGN PATENT DOCUMENTS 965809  8/1964  United Kingdom .............. 428/178

Primary Examiner—Gil Weidenfeld
Assistant Examiner—K. J. Ramsey
Attorney, Agent, or Firm—Paul T. Loef; George W. Finch; Donald L. Royer

[57] ABSTRACT

The structure and the process for making a metallic sandwich structure in which metal worksheets, preferably made from titanium alloy, are joined in a preselected pattern by an intermittent or discontinuous weld. The joined sheets are sealed by a continuous weld to form an expandable envelope. Application of inert gas pressure to the envelope in a limiting fixture superplastically produces the sandwich structure as the expanded structure diffusion bonds to itself or other worksheets. Core configuration of the structure is determined by the intermittent weld pattern. Face sheets of the sandwich structure may be formed from one sheet of the envelope or may be inserted in the limiting fixture and the envelope expanded against the face sheets. Additionally, the face sheets may be preformed or formed concurrently with the core to produce the desired core and sandwich shape in a single operation.

12 Claims, 18 Drawing Figures

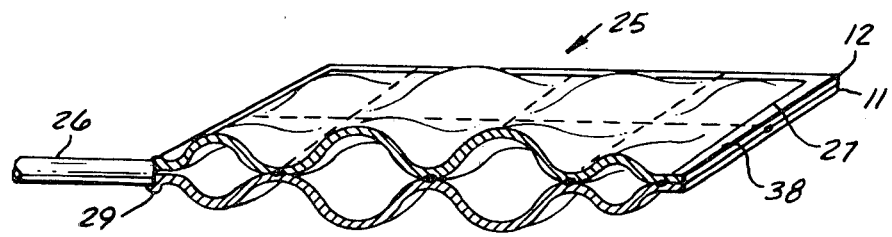
FIG_6
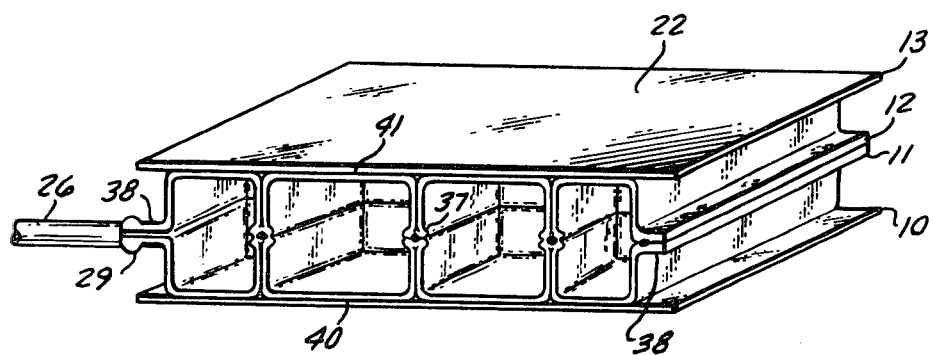
FIG_7
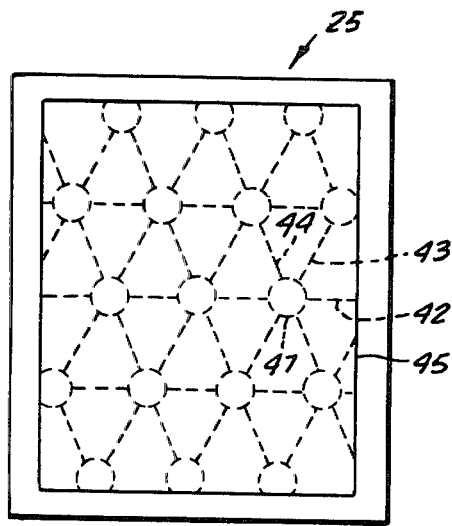
FIG_9
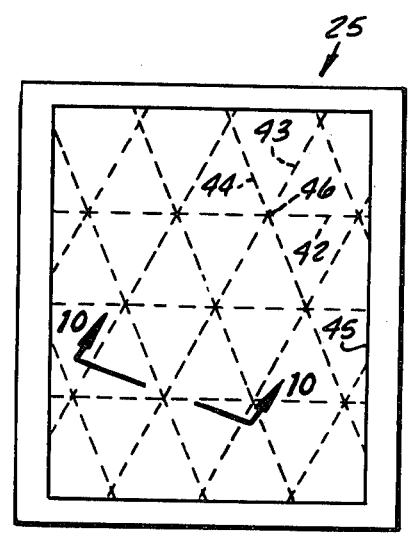
FIG_8

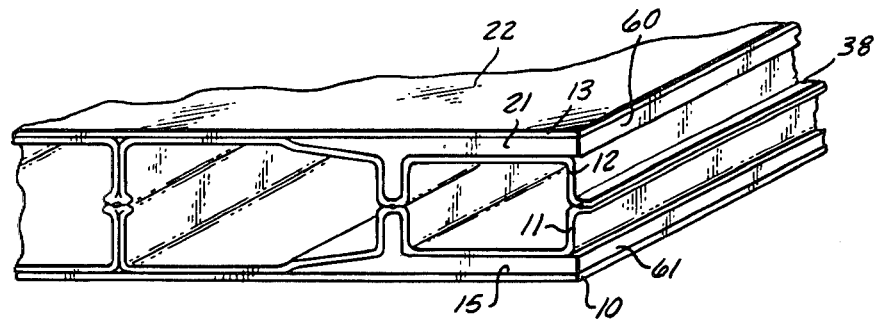
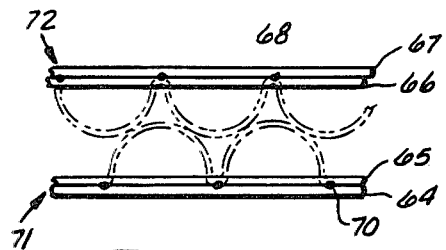
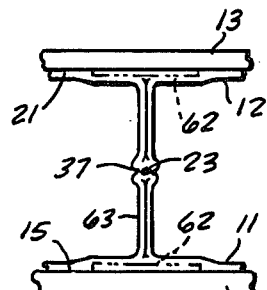
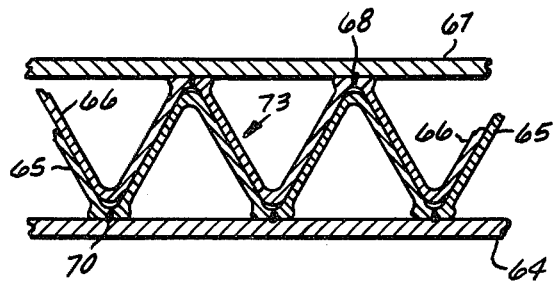
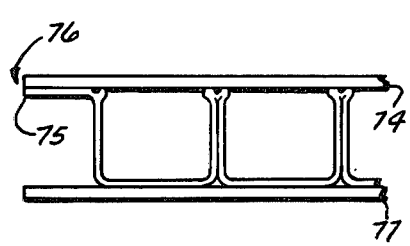
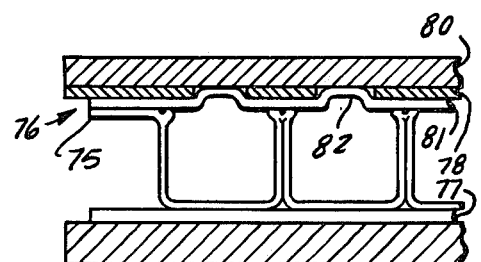

METHOD OF FABRICATING METALLIC SANDWICH STRUCTURE

This is a division of application Ser. No. 898,197 filed Apr. 18, 1978, now issued U.S. Pat. No. 4,217,397.

BACKGROUND OF THE INVENTION

This invention pertains to the production of superplastically formed, complex, metal alloy structures that exhibit improved bi-axial and transverse shear stiffness, and more particularly to the production of metallic sandwich structures superplastically formed from metal blanks and diffusion bonded to form the structure; and the procedure for producing such structures.

Superplasticity is the characteristic demonstrated by certain metals to develop unusually high tensile elongations with minimum necking when deformed within a limited temperature and strain rate range. This characteristic, peculiar to certain metal and metal alloys has been known in the art as applied to the production of complex shapes. It is further known that at these same superplastic forming temperatures the same materials can be diffusion bonded with the application of pressure at contacting surfaces.

The prior art relating to superplastic forming of metallic sandwich structures is exemplified by U.S. Pat. Nos. to Summers et al 3,924,793; and Hamilton et al, 3,927,817. Both of these patents disclose methods for superplastically forming metalic sandwich structures from metal blanks, joined at selected areas and expanded superplastically. Both of these disclosures are limited to performing all the bonding operations prior to forming. The inside worksheets are bonded to the outside face sheets and then the forming is accomplished by inducing tensile stress in the face sheets as by applying gas pressure between the face sheets and thereby drawing the interior sheets with the face sheets as they form outwardly. Since both of these patents teach diffusion bonding prior to forming, it is essential that some means be employed to prevent bonding in the areas to be formed. Summers et al controls bonding by the use of spacers at the point of bonding which act to separate the blank sheets and limit the areas to be joined. Hamilton et al employs maskants or stop-off material to those areas within the stack of metal blanks where no attachment or joining between the sheets is desired. The known maskants, of which Boron nitride and Yttria oxide are the most commonly used, present a serious impairment to the structure unless removed after forming as they produce embrittlement. In complex sandwich structures it is impossible to totally remove the maskant after forming as the surfaces are inaccessable. In addition to the disadvantage of contamination, the use of maskants is also limited to relatively simple concepts and relatively wide joint areas.

Hamilton et al further teaches continuous bonds with vent holes provided in masked areas to avoid unwanted differential pressures between compartments during forming which would distort the structure. During the forming process these vent holes themselves are superplastically stretched and enlarged resulting in a potential source for a fatigue crack or crack growth failure.

Probably the most serious singular limitation of the methods taught in the referenced patents is that the three sheet arrangement with stop-off for creating the sandwich structure is limited to producing what is known in the art as a truss core structure without transverse stiffening. The truss core members are limited to canted elements and the method cannot product vertical members.

SUMMARY OF THE INVENTION

Briefly, and in general terms, the present invention provides a metallic sandwich structure and a method for making the structure from a plurality of metal worksheets. Generally, two or three, contiguous worksheets are joined together by a discontinuous seam weld in a preselected pattern which determines the geometry of the structure of the core to be produced. An expandable envelope is formed by sealing the perimeter of the joined sheets. The joined and unjoined worksheets are then placed in a stacked, spaced relationship, and contained in a limiting fixture. The space between the upper and lower limiting fixture members determines the height and shape of the sandwich structure. At least one of the worksheets is then superplastically formed against another worksheet to which it becomes diffusion bonded to form the desired sandwich structure.

The structure produced includes an infinitely variable geometric arrangement of the core in plan view with double vertical walls which envelope the seam welds and are diffusion bonded to themselves and the outside face sheets to form the sandwich structure.

It is, therefore, a principal object of the present invention to provide a method for making complex metallic sandwich structure with a core which exhibits bi-axial and transverse shear stiffness without voids or discontinuities in either axial direction and tailoring the geometry of the core cell to match the actual loads experienced in application of the structure.

Another object of the invention is to eliminate the need for maskants or stop off and thus avoid the embrittlement of the parent material for failure to remove the maskant.

It is another object of the present invention to equalize pressures between adjacent cells in the core as it is being superplastically formed by providing a seam weld which is just discontinuous enough to create small holes on a regular intermittent pattern for the gas pressure to freely pass between cells.

It is yet another object of the present invention to form a sandwich structure and join chordwise and spanwise (as in an aircraft wing structure) interior or edge doublers in the same operation. Or further, to join previously machined edge fittings by expanding and diffusion bonding the core sheets to the edge members in the same operation, enabling the smooth transfer of loads from the sandwich structure, to the edge fitting, to the supporting structure, which in aircraft may be spars, ribs, and/or frame substructure.

These and other objects and advantages of the present invention will become apparent to those skilled in the art after considering the following detailed specification which covers a preferred embodiment thereof in conjunction with the accompanying drawings.

BRIEF DESCRIPTION OF THE DRAWINGS

FIG. 6 is a sectional view of a partially formed envelope, shown in isometric view, joined in a pattern generally similar to those shown in FIGS. 3, 4, and 5;

FIG. 7 is an isometric sectional view of the completed sandwich structure generally shown in FIGS. 3 through 6 (section lines omitted for clarity);

FIG. 8 is a plan view of a two worksheet envelope assembly joined by a discontinuous seam weld in a generally more complex pattern prior to forming with a continuous seam weld joining the outer border to seal the assembly;

FIG. 9 is another plan view of an envelope assembly as in FIG. 8;

FIG. 13 is another embodiment of the structure shown in FIG. 12 with an alternate edge member;

FIG. 14 is a partial sectional view of an alternative embodiment of a sandwich structure, (section lines omitted) showing a spanwise doubler attached to the inner surfaces of the upper and lower face sheets prior to forming, which result in a reinforced or thicker flange section immediately above the web of the wall of the structure after forming;

FIG. 15 is a partial sectional view of a four piece, double envelope fabrication assembly, with spacers and forming apparatus removed, shown in solid lines prior to forming and one formative phase shown in phantom lines (section lines omitted for clarity);

FIG. 16 is an enlarged cross-sectional elevational view of a sandwich structure formed from the four workpiece fabrication assembly of FIG. 15 to form a typical truss core sandwich structure reflecting canted walls;

FIG. 17 is a cross sectional elevational view of a simple sandwich structure formed from a three workpiece fabrication assembly (section lines omitted); and FIG. 18 is another sectional fragmentary elevational view of a sandwich structure along with its upper and lower limiting fixtures wherein the upper member employs a forming fixture along with the limiting fixture (fixture only shown with section lines for clarity).

The invention will be described in connection with representative structures and the preferred procedure; it should be understood, however, that there is no preferred structure as efficient design tailors the geometry of the structure to the loads as applied, and further, it is not intended to limit the invention to the disclosed structures or procedures. It is intended to cover all the alternatives, modifications, and equivalents that may be included within the spirit and scope of the invention as defined by the appended claims.

DETAILED DESCRIPTION OF THE INVENTION

As indicated above, the material to be superplastically formed must exhibit the characteristic of unusually high tensile elongation with minimum necking when deformed within a limited temperature and strain rate range. While several materials demonstrate these superplastic properties, titanium and its alloys are currently the best known forming materials. The superplastic temperature range varies with the specific alloy used, however, the temperature just below the phase transformation temperature is near optimum. This temperature for titanium alloys is near 1700° F. The best strain rate is actually determined experimentally for each configuration formed, however, it is generally in the range of $10^{-4}$ in./in./sec. ($10^{-4}$ mm/mm/sec) for balanced deformation. If the strain rate is too rapid, it will cause blowout of the material being deformed, and if the rate is too slow, the material loses some of its plasticity.

In addition to the superplastic properties, the material to be formed must be suitable for diffusion bonding. Diffusion bonding, as used herein, refers to the solid-state joining of the surfaces of similar or dissimilar metals by applying heat and pressure for a time duration to cause co-mingling of the atoms at the joint interface.

By way of distinction, fusion bonding or welding, as used herein, refers to the metallurgical joining or welding of the surfaces of similar or dissimilar metals by applying heat so as to cause the materials at the joint interface to reach the liquid or plastic state and thereby merge into a unified whole.

Figure 1:
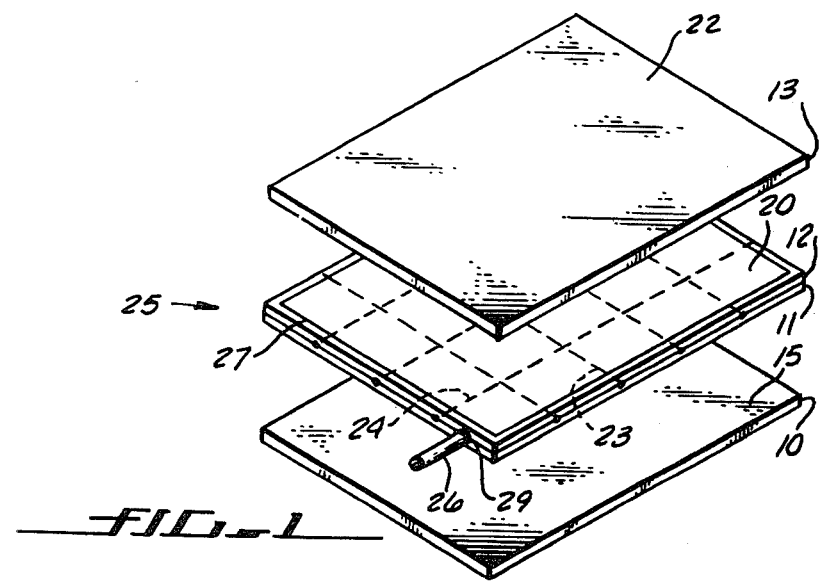
FIG. 1 is an exploded view of the four worksheet fabrication assembly, in which the inner two worksheets have been selectively joined, prior to forming the structure.

A four worksheet metal sheet fabrication assembly prior to being superplastically formed into a sandwich structure according to the subject invention is shown in FIG. 1. The fabrication assembly is made up of metal worksheets 10, 11, 12, and 13, each of which has two opposed principal surfaces, 14 and 15, 16 and 17, 18 and 20, and 21 and 22 respecively (also see FIG. 3). The outer sheets 10 and 13 are further identified herein as face sheets and the sheets 11 and 12 as interior sheets. Superplastic, interior sheets 11 and 12 are joined by a discontinuous or intermittent seam weld, in a predetermined pattern, as indicated by the exemplary sets of parallel dotted lines 23 and 24 to form an envelope 25. While the weld pattern shown is rectangular in geometric shape the pattern is limited only by the imagination of the designer. The orientation of the weld pattern, along with the shape of the die, determines the shape of the core structure. If the containment dies are flatplates and there is a single envelope to be expanded against face sheets, as shown in FIG. 1, the plan views of the weld pattern and the expanded core are coincidental as will be shown.

The discontinuous seam weld which joins the interior worksheets 11 and 12 may be of any type weld sufficient to maintain the bond at the superplastic forming temperature. However, the width of the weld effects the shape of the wall formed after the core is expanded. The microstructure of the material subjected to the weld, in most alloys, has been changed to the extent that it has been rendered non-plastic. Consequently, the weld retains its preformed shape after forming as can be seen in the weld joint 37 in FIG. 5. In most applications, it is desirable to maintain the width of the weld as narrow as feasibly possible and still maintain structural integrity. This limits the utilization of the diffusion bonding process to join the worksheets to be formed at this step in the process. The need for a narrow weld and the attendant maskant location and tolerance problems associated therewith, along with the previously noted problem of titanium embrittlement as a result of failure to remove the maskant further limits the use of diffusion bonding prior to forming. Any of the fusion or resistance welding processes, including roll seam, spot, electron beam, or even arc welding are generally preferably methods to join the sheets to be formed. An intermittent roll seam weld, which is nothing more than a series of spot welds, is the preferred method. It can be readily programmed to provide continuous welds separated by very brief weld cessations or discontinuities just sufficient enough to create minimum size vent holes to balance the gas pressure between the cells of the core structure during the forming process. Additionally, the roll seam weld is narrow and can be easily programmed to match any desired design pattern. Again, continuous seam welds may be employed in the portions of the structure which are critically loaded and intermittent welds employed in the noncritically loaded portions of the structure. FIGS. 8 and 9 reflect more complex patterns employed to join two worksheets to form an envelope to be expanded.

The envelope 25 is locally deformed between worksheets 11 and 12 to provide a receptacle generally matching the outside diameter of the expansion tube 26. The tube 26 is then butt welded to the receptacle so provided to form a joint and seal. The envelope 25 is then sealed by applying a continuous seam weld 27 around the perimeter of the envelope beginning at one side of the expansion tube 26 and ending at the other side of the expansion tube 26 so as to provide an inflatable envelope when gas pressure is applied at the expansion tube 26.

Figures 2, 3:
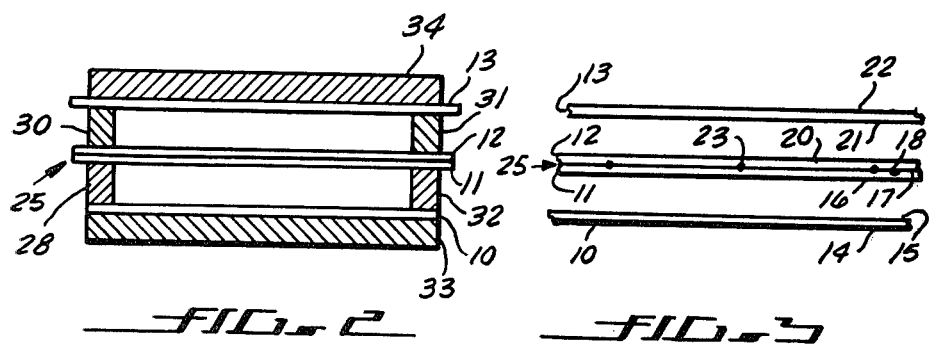
FIG. 2 is a cross-sectional, elevational view of a generalized apparatus used to form metal sandwich structures by the method of this invention, with the four worksheet fabrication assembly of FIG. 1 inserted therein (with the apparatus only shown with section lines for clarity)
FIG. 3 is a partial section of a four workpiece fabrication assembly with the forming spacers and apparatus removed prior to forming (section lines omitted for clarity)

FIG. 2 is a generalized limiting fixture suitable for containing the fabrication assembly shown in FIG. 1. The limiting fixture contains the spacers 28 and 32 between the face sheet 10 and lower worksheet 11 of the envelope 25 and the spacers 30 and 31 between the upper worksheet 12 of the envelope 25 and the upper face sheet 13. Similar parts between the various figures shown are identified with the same number for purposes of continuity and clarity. Lower and upper frame members 33 and 34 complete the limiting fixture. Frame members 33 and 34 are shown to be flat plates, however, these frame members are to be considered shaping dies where other than a flat surfaced sandwich structure is desired. With complex shaped framing members, it may be necessary to preform the face sheets 10 and 13 to fit the shape of these frame members. Of course, suitable clamping and heating means, not shown, need to be provided to contain the entire limiting fixture and heat the worksheets 10 through 13, which will be further discussed later.

Figure 4:
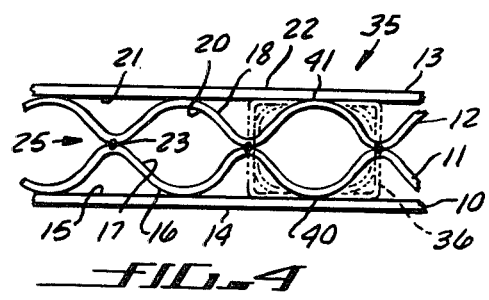
FIG. 4 is the same view as shown in FIG. 3, except that the assembly is partially formed, except for one cell, which is shown in several formative phases until it reaches the final form (section lines omitted for clarity)

FIGS. 3 through 7 illustrate various phases in superplastically forming and bonding the envelope 25 of FIG. 1 to its final core configuration diffusion bonded to the face sheets 10 and 13. These figures are all shown with the limiting fixture removed for clarity. FIG. 3 shows the fabrication assembly of FIG. 1 prior to any forming. After heating, inert gas pressure is applied to the expansion tube 26 at a rate which results in a suitable strain rate to superplastically expand the envelope 25. FIG. 6 shows a section of an isometric view of the envelope 25 partially formed to a phase essentially similar to the section shown in FIG. 4. One cell 35 of FIG. 4 is shown further expanded in phantom lines to reflect two further phases of the expansion until it reaches its final rectangular shape as at 36.

The strain rate, noted previously to be important to balance and stable forming, is determined by the rate of change of the differential gas pressure across the envelope being expanded in conjunction with the particular structural spans involved in the envelope being expanded to form the core. Therefore, the gas pressure in the envelope being expanded is increased at a predetermined rate which is determined experimentally for the particular structure involved. Of course, pressure between the compartments of the envelope being expanded must be kept essentially equal or the core formed will be distorted from the structural shape desired. Pressure between the compartments of the envelope 25 is maintained equal by the vent holes provided by cessation or discontinuities in the intermittant seam welds provided at 23 and 24. It may be necessary with some core structures to increase the expansion pressure, at prescribed rates, stopping at several pressure levels to allow the pressure within the envelope compartments to equalize. At any rate, the pressure within the envelope is increased and if the pressure is equalized between compartments or cells it will eventually expand against the face sheets 10 and 13 and continue to form until one cell meets another in a balanced symmetrical core structure as shown in the section FIG. 5. As the cell expands and contacts the inner surfaces 15 and 21 of the face sheets 10 and 13, the cell sheets 11 and 12 are diffusion bonded to the face sheets.

The core of two worksheet envelopes expanded to meet outer face sheets is characterized by displacement of the intermittent welds shown at 23 and 24 in FIG. 1. The top and bottom surfaces of the weld are totally enveloped by the parent material and located at the midpoint in the vertical walls of the structure as at 37.

FIG. 7 is a sectioned isometric view of the completed structure showing the flashing 38 formed by the spacer blocks 28, 30, 31, and 32 of FIG. 2 which form a portion of the limiting fixture.

Figure 5:
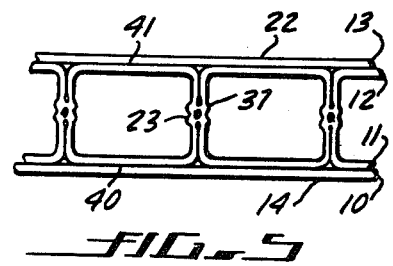
FIG. 5 is the final formation of the sandwich structure shown in FIGS. 3 and 4 (section lines omitted for clarity)

FIGS. 4, 5, and 7 depict the interface of the outer surfaces 16 and 18 of the envelope 25 with the inner surfaces 15 and 21 of the face sheets 10 and 13 (FIG. 3) as lines 40 and 41 for purposes of clarity to better understand the forming of the worksheets. However, it is to be understood, no line exists at this interface as the surfaces are diffused together to form a unified whole.

FIGS. 8 and 9 are two worksheet envelope assemblies joined by three sets of intermittent seam welds 42, 43, and 44 to form a more complex pattern generally known as an isogrid pattern. The sets of intermittent weld lines represented by the lines 42, 43, and 44 intersect at a common set of points as at 46, FIG. 8, which may be viewed as forming the apex for six triangles. When the envelope of FIG. 8 is expanded, the common intersection point 46 will expand as a solid column. FIG. 9 represents an alternative embodiment of a similar isogrid pattern wherein the triangles formed by the intersection of the intermittent weld lines 42, 43, and 44 are truncated by the circle 47. The circle 47 will expand to form a cylinder at the intersection of the core web which tends to stiffen the pattern and redistribute the loads. These strong circles can be used for attaching panels as at the edges of the sandwich structure or alternatively to provide points of attachment for substructure. The solid perimeter line at 45 represents a continuous seam weld to seal the two worksheets of the envelope. The expansion tubes have been omitted in both FIGS. 8 and 9.

Figure 10:
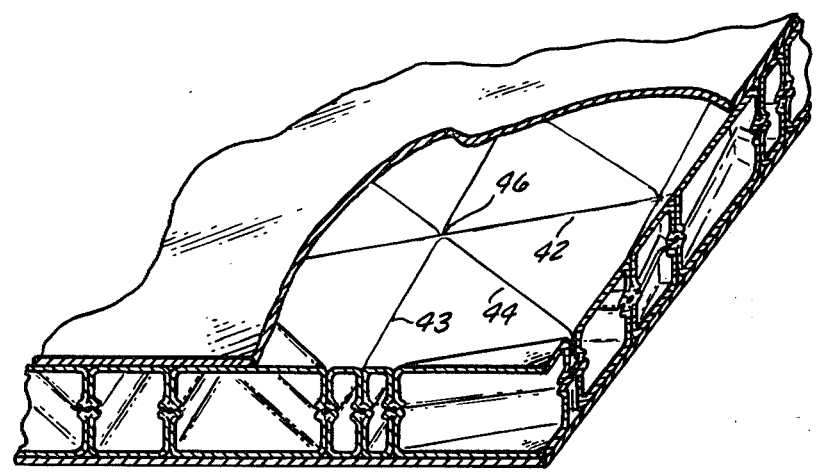
FIG. 10 is a partial isometric sectional view of FIG. 8, after forming, with a portion of the upper face sheet removed to better show the complex internal structure (section lines, except facesheet, omitted for clarity)

The expansion of the envelope of FIG. 8 in a limiting fixture as shown in FIG. 2 will result in a sandwich structure as shown in partial isometric section, with a portion of the upper face sheet removed, in FIG. 10.

Figure 11:
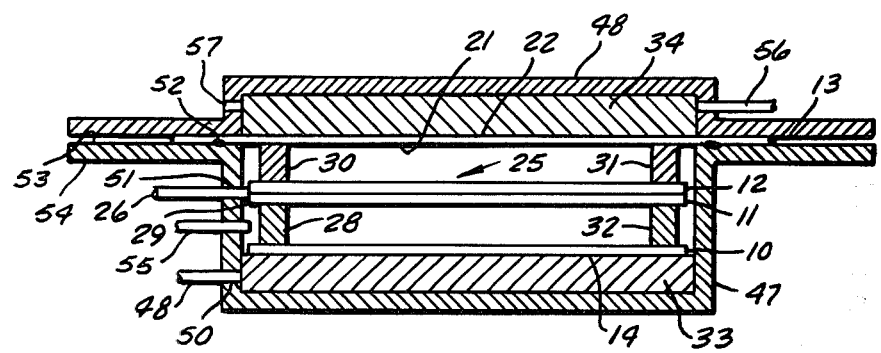
FIG. 11 is a cross-sectional elevational view of the preferred embodiment of a forming apparatus used for fabrication of metal sandwich structures reflecting a four worksheet metal sheet assembly (a face sheet, two sheets joined to form an envelope, and another face sheet) inserted therein (apparatus only shown with section lines for clarity)

The complete forming apparatus for the fabrication of metal sandwich structures in accordance with the subject invention is shown in what is currently the preferred embodiment in FIG. 11. The apparatus shown includes the four worksheet metal fabrication assembly of FIG. 1 and the limiting fixture of FIG. 2. The apparatus consists of a containment box 47 and a cover 48, which must be fabricated from a material demonstrating suitable strength at the 1700° F. forming temperature range. Further, the containment box is a safety vessel in that it must contain a possible blowout of the envelope to be formed at the forming temperature. The box 47 contains a lower frame member 33 which in its preferred embodiment is a vacuum chuck. The vacuum chuck is preferred in that it securely holds the lower face sheet 10 against the lower frame member 33 to prevent gathering of the sheet 10 when the envelope 25 is further expanded after initial contact and bonding with facesheet 10. The vacuum chuck lower frame member 33 is connected to a suitable vacuum source via the tube 48 which makes a sealed penetration of the containment box 47 at 50. Stacked on top of the facesheet 10 are the spacers 28 and 32, followed by the envelope 25, the upper spacers 30 and 31, and the upper facesheet 13 as previously explained in conjunction with FIG. 2. Both sets of spacers, of course, support the entire perimeter between the facesheet and the envelope and determine the height of the core after the envelope 25 is formed.

The expansion tube 26, which is welded to the envelope 25 at 29 makes a sealed penetration of the containment box 47 at 51. Connected to the expansion tube 26, in an upstream direction, is a pressure regulator followed by a shutoff valve followed by an inert gas source (preferably argon) all of which have been omitted from the drawing. While the pressure required is a function of the thickness of the sheets of the envelope 25 to be expanded and the configuration of the core pattern, titanium worksheets in the 0.050 in. (127 mm) range can be expanded below 200 psi. It is conceivable that thicknesses requiring up to 1000 psi or higher are feasible.

A metal seal 52 is placed between the upper surface 53 of the flange 54 of the containment box 47 and the lower surface 21 of the upper facesheet 13. The seal 52 does not seal until the apparatus is heated and pressure applied to the cover 48. In this fashion, a purge gas (again, preferably argon) may be applied at the purge tube 55 forcing the ambient air out of the vessel prior to sealing the vessel at 52 and assuring an inert atmosphere within the box 47. An inert atmosphere is required to prevent contamination of the parts to be formed and diffusion bonded. Most gasses, including air, will readily react with the material of the worksheets at the forming temperatures.

Placed on top of the upper facesheet 13 is the upper frame member 34 followed by the cover 48. The space enclosed inside the cover 48 is again purged by an inert gas via the tube 56 and exhaused via the vent 57.

Maskants must be applied wherever the limiting fixture contacts the worksheets as between the lower surface of the upper frame member 34 and the upper surface 22 of the face sheet 13, the upper surface of the lower frame member 33 and the bottom surface 14 of the lower face sheet 10. The contacting surfaces between the spacers 28, 30, 31, and 32 with the interior surfaces of the face sheets 10 and 13, and the outer surfaces of the envelope 25 must also be coated with a suitable maskant to prevent diffusion bonding between the limiting fixture and the parts to be expanded to form the sandwich structure. As previously noted, boron nitride and yttria oxide are currently the preferred maskants. Note that all the surfaces subjected to the maskant are readily cleanable after forming as they are all outside exposed surfaces and embrittlement as a result of failure to remove the maskant is avoided.

Clamping and heating means must be applied to the forming apparatus of FIG. 11. One method is to place the entire appartus of FIG. 11 in a heated platen press, not shown, clamping the cover 48 to the containment box 47 and heating the entire apparatus concurrently. Temperatures of the worksheets to be formed may be measured and controlled by thermocouples attached to the protruding edge of the envelope 25 and penetrating the containment box 47. Alternatively, the cover 48 may be clamped to the box 47 and the entire apparatus placed in an autoclave.

After clamping and heating and a seal is formed at 52, a positive pressure of several psi should be maintained at the purge tube 55. This pressure maintains the inert atmosphere inside the containment box 47 and applies a differential pressure across the upper face sheet 13, which holds the face sheet against the upper frame member 34 to perform a function similar to the vacuum chuck of the lower frame 33.

Figure 12:
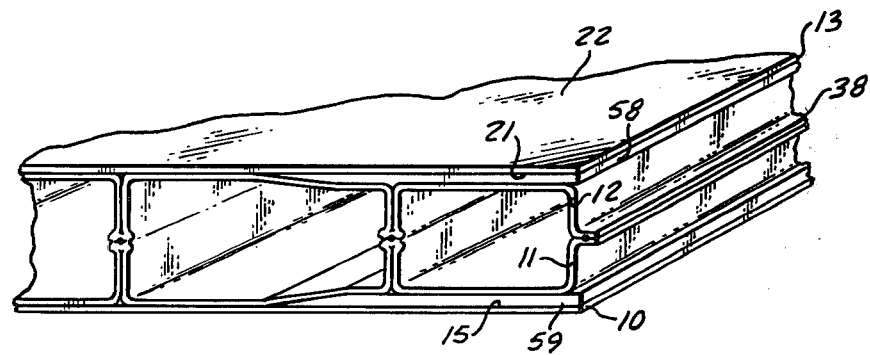
FIG. 12 is a perspective view of typical sandwich structure with the flashing removed from one end and a machined fitting inserted in the edge of the structure face sheets and the core sheets expanded and diffusion bonded to the machined edge member.

FIGS. 12 and 13 depict alternative embodiments in which edge members have been incorporated in the sandwich structure. Upper and lower edge members 58 and 59 were bonded to the inner surfaces 21 and 15 of the upper and lower face sheets 13 and 10 prior to expanding the envelope 25 so that the core expands around and encompasses the edge members 58 and 59 leaving a reinforced edge structure. FIG. 13 shows a more complex edge structure where edge members 60 and 61 have been similarly inserted in the sandwich structure providing a reinforced edge member to enable the smooth transfer of loads to supporting members such as in aircraft, the spars, ribs, and frame substructure. The flexibility of the process is not only reflected in FIGS. 12 and 13, but further reflected in FIG. 14.

In FIG. 14 doubler strips 62, shown in phantom, have been bonded to the inner surfaces 21 and 15 of the facesheets 13 and 10 immediately above and below, and in line with, the projection of the intermittent seam welds 23 on the envelope 25 (also see FIGS. 1 and 3). When the worksheets 11 and 12 of the envelope 25 are superplastically expanded to form the core, the expanded worksheets envelope and are diffused to and around the doubler 62 and the facesheets 10 and 13. A portion of the expanded core is a vertical wall 63, which terminates at either end in a perpendicular surface formed by a combination of the expanded worksheets 11 and 12, the doublers 62, and the facesheets 10 and 13. The effect of the doubler 62 is to locally reinforce the flange at this intersection or termination. Again, following superplastic forming and diffusion bonding, the resulting structure, metallurgically, is one homogenous whole, and no lines of demarcation show between the core sheets, the doublers, and the face sheets.

FIGS. 15 and 16 represent an alternative embodiment of the sandwich structure which is known in the art as a truss core and was discussed previously in conjunction with the prior art. The structure is again formed from a four workpiece 64, 65, 66, and 67 fabrication assembly. However, the lower facesheet 64 is bonded to the lower interior worksheet 65 by an intermittent or discontinuous seam weld as at 70 to form an envelope 71 by sealing the outer perimeter of the worksheets 64 and 65. An upper envelope 72 is made by joining the upper interior worksheet 66 with the upper face sheet 67 again by a discontinuous seam weld 68 and a continuous perimeter seam weld to form a seal. Both the lower envelope 71 and the upper envelope 72 must be provided with an expansion tube not shown. Both interior worksheets 65 and 66 must be made from a material capable of being superplastically formed and diffusion bonded. The weld pattern required to produce a simple truss core is nothing more than a set of parallel welds joining each envelope 71 and 72 oriented with respect to each other so that when one envelope is superimposed on the other, the projection of the weld on the first envelope intersects the space between welds on the opposing envelope.

To form the truss core of FIG. 16, the lower and upper envelope assemblies 71 and 72 (FIG. 15) would be placed in a limiting fixture similar to FIG. 2, modified as follows:

Place the lower flat plate frame assembly at the bottom of the stack similar to 33; follow with the lower envelope 71, oriented with the face sheet 64 in contact with the lower frame member and protected by a suitable maskant; next, place a set of spacers, maskant protected, approximately equal in height to the desired height of the expanded core; then the upper envelope 72 is placed atop the spacers oriented with the face sheet 67 up, maskant protected, and contacting the flatplate, upper frame member similar to 34, FIG. 2. The entire assembly is then placed in a suitable containment apparatus similar to FIG. 11 except adapted to receive this particular combination.

As represented by the phantom lines, FIG. 15, representing a partially expanded core, the interior worksheets 65 and 66 are expanded by the application of the inert gas to the respective envelopes 71 and 72 until they meet, as illustrated. The envelopes continue to expand and diffusion bond in a balanced and stable fashion by the application of increasing but equal gas pressure until the core structure 73 of FIG. 16 is formed.

It should now be apparent that the sandwich structue of FIG. 16 can be readily reconfigured, using the method of the present invention, as opposed to the prior art, to produce equal stiffness in both horizontal axes. This can be accomplished by adding an additional, identical set of intermittent welds to the envelopes 71 and 72 except the new welds are oriented 90° to the existing weld set to produce an identical, perpendicular set of welds. The resulting core will be a monolithic structure reflecting alternate inverted pyramids in geometric shape.

A three worksheet sandwich structure is illustrated in FIG. 17. Upper worksheet 74 is joined by an intermittent seam weld, in a rectangular pattern and sealed at the perimeter to form the envelope 76 similar to envelope 25, FIG. 1. The envelope 76 is then expanded by the application of inert gas to meet the lower face sheet 77 and form the rectangular core section shown in FIG. 17. The worksheets, containment fixture and method shown and described in FIGS. 1 and 2 with the upper face sheet 13 and the spacers 30 and 31 removed will form the sandwich structure of FIG. 17.

FIG. 18 is an alternative embodiment of the structure shown in FIG. 17 wherein the upper frame member is a shaping die consisting of two elements 78 and 80. The die member 78 is provided with a series of apertures, the centers of which are oriented to coincide with the centers of the plan view rectangles in the expanded core. When the envelope 76 is expanded by the application of inert gas, the upper face sheet 81 is expanded into the apertures and against the flat plate frame member 80 to form a raised boss 82. The lower frame member 83 is a flat plate similar to that used to form the structure in FIG. 17. While the structure of FIG. 18 is here to illustrate that the face sheet may be formed as well as the core sheets by the application of shaping dies, in actual application, this structure is subjected to a machining operation to remove the raised bosses 82, leaving apertures centrally located above the rectangular compartments of the core to form an acoustical liner for a jet engine.

All the sandwich structures illustrated and described above involve variations or combinations of two worksheet envelopes. It is clear, however, that a three worksheet envelope can be expanded, which, for example, could produce a structure similar to FIG. 17, but symmetrical about the face sheet 74. Structure can also be produced combining several cores with or without interior face sheets.

While we have described particular embodiments of the invention for purposes of illustration, it will be understood that various changes and modifications can readily be made within the spirit of the invention. The invention, accordingly, is not to be taken as limited except by the scope of the appended claims.

We claim:

1. The method of making a metallic structure from a plurality of worksheets comprising:
providing a plurality of metal worksheets, at least one of said worksheets made from a metal alloy having superplastic characteristics;
joining at least two of said worksheets, at least one of which is said at least one of said worksheets made from a metal alloy having superplastic characteristics in facing contact with each other by a discontinuous weld in a preselected pattern to form at least one set of joined worksheets;
sealing the perimeter of said joined worksheets while providing means for the admission of pressurized gas between said joined worksheets producing at least one inflatable envelope assembly;

providing a limiting fixture having opposing upper and lower surfaces and defining a cavity therebetween;

positioning said at least one inflatable envelope assembly in said cavity of said limiting fixture with said at least one worksheet made from a metal alloy having superplastic characteristics oriented to face, in spaced relationship, one of said opposed upper and lower surfaces of said limiting fixture; and heating said worksheets to a temperature suitable for superplastic forming and applying gas pressure at said means for the admission of pressurized gas, producing a differential pressure between the interior and exterior of said inflatable envelope assembly causing at least one of said worksheets to expand about said discontinuous welds to form a web.

2. The method, as set out in claim 1, wherein said plurality of worksheets is three worksheets and said third worksheet is positioned against said one of said opposed upper and lower surfaces of said limiting fixture in faced, spaced relationship to said at least one worksheet made from a metal alloy having superplastic characteristics which forms one side of said inflatable envelope.

3. The method as set out in claim 2 further comprising a fourth worksheet and inserting said fourth worksheet against the opposite surface of said one of said opposed upper and lower surfaces of said limiting fixture, also in faced, spaced relationship with said inflatable envelope, and at least the two worksheets of said inflatable envelope are made from a metal alloy having superplastic characteristics.

4. The method as defined in claim 3 also including the step of preforming said worksheets contacting said opposing upper and lower surfaces of said limiting fixture.

5. The method of claim 3 wherein said temperature range suitable for superplastic forming is suitable to produce diffusion bonding.

6. The method as set out in claim 3, further comprising the step of bonding at least one metal edge member to said surface of said worksheet in faced spaced relationship with said inflatable envelope wherein said at least one metal edge member is contained within said limiting fixture cavity, whereby said at least one worksheet of said envelope assembly deforms against and diffusion bonds to said at least one metal edge member and said attached worksheet.

7. The method as set out in claim 2, further comprising the steps of sealing the perimeter of the interfacing surfaces between said envelope assembly and said third worksheet and applying pressure in said sealed area between said envelope assembly and said third worksheet essentially concurrently with the step of applying pressure to said inflatable envelope assembly whereby said third worksheet is expanded and deformed to match the shape of said one of said opposed upper and lower surfaces of said limiting fixture.

8. The method as set out in claim 1 wherein said plurality of worksheets is four and at least two of said worksheets are made from a metal alloy having superplastic characteristics and further comprising the further steps of joining said third and fourth worksheets, at least one of which is made from a metal alloy having superplastic characteristics, in facing contact with each other by a discontinuous weld in a preselected pattern to form a second set of joined worksheets and sealing the perimeter of said second set of joined worksheets while providing means for the admission of pressurized gas between said second set of joined worksheets producing a second inflatable envelope assembly and positioning said second inflatable envelope in said cavity of said limiting fixture opposite and in spaced relationship to said first inflatable envelope with said at least two worksheets made from a metal alloy having superplastic characteristics facing each other and heating said envelope assemblies to a temperature suitable for superplastic forming and applying gas pressure at said means for the admission of pressurized gas at said first and second sets of joined worksheets expanding said first and second envelope assemblies.

9. The method as set out in claim 8 further comprising the step of positioning an additional worksheet in spaced relationship between said first and second envelope assemblies whereby said worksheets of said envelope assemblies are expanded against and diffusion bonded to opposing sides of said additional worksheet and located between said worksheets positioned against said opposed upper and lower surfaces of said limiting fixture.

10. The method of claim 1 further comprising, after the step of positioning said at least one, inflatable envelope assembly, the steps of enclosing said limiting fixture and providing an inert gas environment within said enclosure.

11. The method of claim 1 further comprising the step of treating the surfaces of said limiting fixture with a maskant to prevent bonding between said limiting fixture and said worksheets.

12. A metallic structure produced in accordance with the process of claim 1, 2, 3 or 8.

* * * * *